US012587258B2

(12) United States Patent
Zheng et al.

(10) Patent No.: US 12,587,258 B2
(45) Date of Patent: Mar. 24, 2026

(54) BEAM FAILURE RECOVERY MEDIUM ACCESS CONTROL SIGNALING FOR MULTI TRANSMIT-RECEIVE POINT SYSTEM

(71) Applicant: QUALCOMM Incorporated, San Diego, CA (US)

(72) Inventors: Ruiming Zheng, Beijing (CN); Linhai He, San Diego, CA (US); Mostafa Khoshnevisan, San Diego, CA (US); Yan Zhou, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/245,600

(22) PCT Filed: Oct. 30, 2020

(86) PCT No.: PCT/CN2020/125129
§ 371 (c)(1),
(2) Date: Mar. 16, 2023

(87) PCT Pub. No.: WO2022/088012
PCT Pub. Date: May 5, 2022

(65) Prior Publication Data
US 2023/0362670 A1 Nov. 9, 2023

(51) Int. Cl.
| | |
|---|---|
| *H04W 16/28* | (2009.01) |
| *H04B 7/06* | (2006.01) |
| *H04W 76/19* | (2018.01) |

1200 ⟶

(52) U.S. Cl.
CPC ........ *H04B 7/06964* (2023.05); *H04W 16/28* (2013.01); *H04W 76/19* (2018.02)

(58) Field of Classification Search
CPC ..... H04B 7/0695; H04W 16/28; H04W 76/19
See application file for complete search history.

(56) References Cited

U.S. PATENT DOCUMENTS

| | | | |
|---|---|---|---|
| 2020/0267048 A1 | 8/2020 | Yu et al. | |
| 2020/0344621 A1 | 10/2020 | Xu et al. | |

(Continued)

FOREIGN PATENT DOCUMENTS

| | | |
|---|---|---|
| CA | 3051706 A1 | 2/2020 |
| CN | 110226340 A | 9/2019 |

(Continued)

OTHER PUBLICATIONS

International Search Report and Written Opinion—PCT/CN2020/125129—ISA/EPO—Jul. 20, 2021.

(Continued)

*Primary Examiner* — Brian D Nguyen
(74) *Attorney, Agent, or Firm* — Harrity & Harrity, LLP

(57) ABSTRACT

Various aspects of the present disclosure generally relate to wireless communication. In some aspects, a user equipment (UE) may configure a medium access control control element (MAC-CE) to indicate beam failure information for one or more serving cells, wherein the beam failure information is associated with at least one of a first transmit-receive point (TRP) or a second TRP of the one or more serving cells. The UE may transmit the MAC-CE to a base station via at least one serving cell. Numerous other aspects are provided.

30 Claims, 15 Drawing Sheets

1210 ⟶ Configure a medium access control control element (MAC-CE) to indicate beam failure information for one or more serving cells, wherein the beam failure information is associated with at least one of a first transmit-receive point (TRP) or a second TRP of the one or more serving cells 1220 ⟶ Transmit the MAC-CE to a base station via at least one serving cell

(56)　　　　　References Cited

U.S. PATENT DOCUMENTS

| | | | | |
|---|---|---|---|---|
| 2021/0351834 A1* | 11/2021 | Yang | ..................... | H04W 72/23 |
| 2023/0008664 A1* | 1/2023 | Matsumura | ........... | H04W 72/21 |
| 2023/0106244 A1* | 4/2023 | Yu | ......................... | H04B 7/0695 |
| | | | | 370/329 |
| 2023/0209556 A1* | 6/2023 | Kang | .................... | H04L 5/0048 |
| | | | | 370/329 |
| 2023/0276519 A1* | 8/2023 | Gao | ..................... | H04B 7/0695 |
| | | | | 370/252 |
| 2023/0284198 A1* | 9/2023 | Song | ................... | H04W 72/231 |
| | | | | 370/252 |
| 2025/0151149 A1* | 5/2025 | Tsai | ..................... | H04L 5/0048 |

FOREIGN PATENT DOCUMENTS

| | | | |
|---|---|---|---|
| CN | 110771055 | A | 2/2020 |
| CN | 110896546 | A | 3/2020 |
| CN | 111278122 | A | 6/2020 |
| CN | 111818655 | A | 10/2020 |
| WO | 2019192621 | A1 | 10/2019 |
| WO | 2020063126 | A1 | 4/2020 |

OTHER PUBLICATIONS

Sony: "Considerations on Beam Management for Multi-TRP," 3GPP TSG RAN WG1#102e, R1-2005563, E-meeting, Aug. 17-28, 2020, Aug. 7, 2020 (Jul. 8, 2020), the whole document, 6 pages.
Supplementary European Search Report—EP20959174—Search Authority—Munich—Jun. 25, 2024.

* cited by examiner

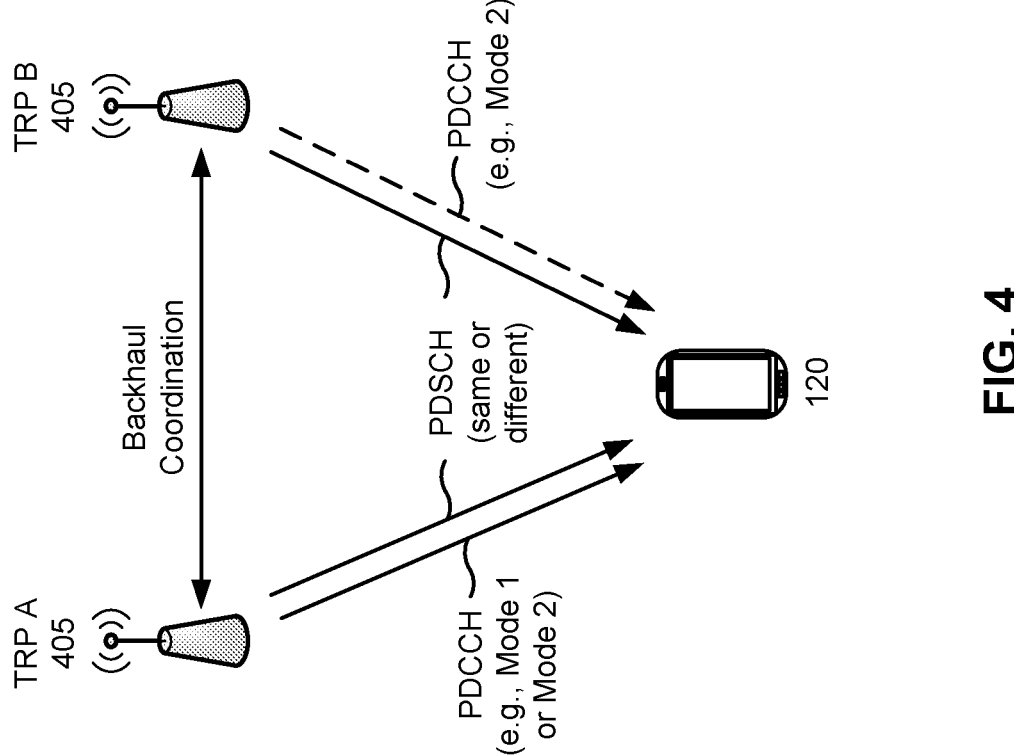
FIG. 4

FIG. 11

1210 — Configure a medium access control control element (MAC-CE) to indicate beam failure information for one or more serving cells, wherein the beam failure information is associated with at least one of a first transmit-receive point (TRP) or a second TRP of the one or more serving cells 1220 — Transmit the MAC-CE to a base station via at least one serving cell

1200

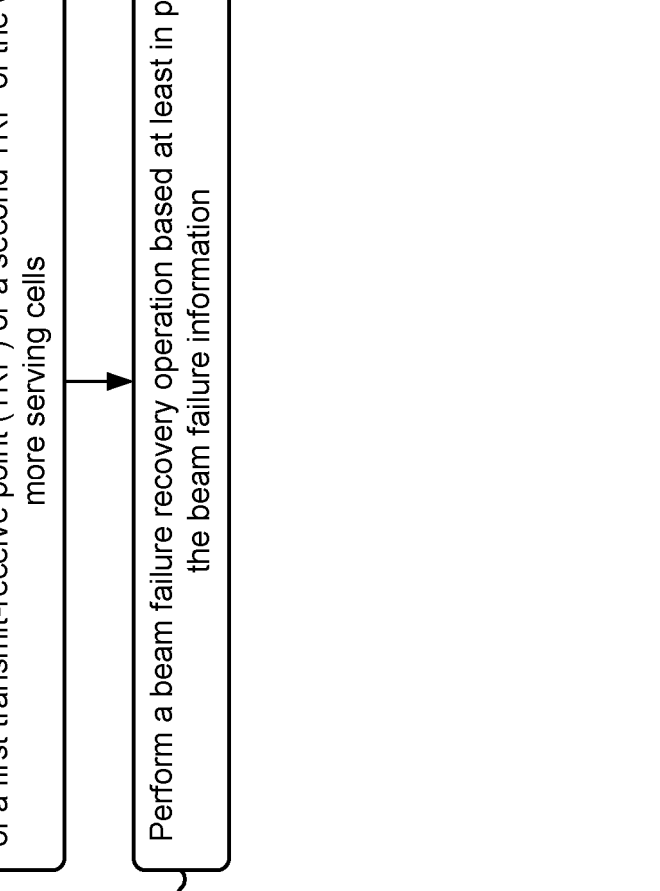

1300

1310 — Receive a medium access control control element (MAC-CE) to indicate beam failure information for one or more serving cells, wherein the beam failure information is associated with at least one of a first transmit-receive point (TRP) or a second TRP of the one or more serving cells 1320 — Perform a beam failure recovery operation based at least in part on the beam failure information

FIG. 13

BEAM FAILURE RECOVERY MEDIUM ACCESS CONTROL SIGNALING FOR MULTI TRANSMIT-RECEIVE POINT SYSTEM

CROSS-REFERENCE TO RELATED APPLICATION

This application is a 371 national stage of Patent Cooperation Treaty (PCT) Application No. PCT/CN2020/125129 filed on Oct. 30, 2020, entitled "BEAM FAILURE RECOVERY MEDIUM ACCESS CONTROL SIGNALING FOR MULTI TRANSMIT-RECEIVE POINT SYSTEM," which is hereby expressly incorporated by reference herein.

FIELD OF THE DISCLOSURE

Aspects of the present disclosure generally relate to wireless communication and to techniques and apparatuses for beam failure recovery (BFR) medium access control (MAC) signaling for a multi transmit-receive point (TRP) system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes configuring a medium access control control element (MAC-CE) to indicate beam failure information for one or more serving cells, wherein the beam failure information is associated with at least one of a first TRP or a second TRP of the one or more serving cells; and transmitting the MAC-CE to a base station via at least one serving cell.

In some aspects, a method of wireless communication performed by a base station includes receiving a MAC-CE to indicate beam failure information for one or more serving cells, wherein the beam failure information is associated with at least one of a first TRP or a second TRP of the one or more serving cells; and performing a beam failure recovery operation based at least in part on the beam failure information.

In some aspects, an apparatus for wireless communication includes means for configuring a MAC-CE to indicate beam failure information for one or more serving cells, wherein the beam failure information is associated with at least one of a first TRP or a second TRP of the one or more serving cells; and means for transmitting the MAC-CE to a base station via at least one serving cell.

In some aspects, an apparatus for wireless communication includes means for receiving a MAC-CE to indicate beam failure information for one or more serving cells, wherein the beam failure information is associated with at least one of a first TRP or a second TRP of the one or more serving cells; and means for performing a beam failure recovery operation based at least in part on the beam failure information.

In some aspects, a user equipment (UE) for wireless communication includes memory; one or more processors coupled to the memory; and instructions stored in the memory and operable, when executed by the one or more processors, to cause the UE to: configure a MAC-CE to indicate beam failure information for one or more serving cells, wherein the beam failure information is associated with at least one of a first TRP or a second TRP of the one or more serving cells; and transmit the MAC-CE to a base station via at least one serving cell.

In some aspects, a base station for wireless communication includes memory; one or more processors coupled to the memory; and instructions stored in the memory and operable, when executed by the one or more processors, to cause the base station to: receive a MAC-CE to indicate beam failure information for one or more serving cells, wherein the beam failure information is associated with at least one of a first TRP or a second TRP of the one or more serving cells; and perform a beam failure recovery operation based at least in part on the beam failure information.

In some aspects, a non-transitory computer-readable medium stores one or more instructions for wireless communication that, when executed by one or more processors of a user equipment (UE), cause the UE to: configure a MAC-CE to indicate beam failure information for one or more serving cells, wherein the beam failure information is associated with at least one of a first TRP or a second TRP of the one or more serving cells; and transmit the MAC-CE to a base station via at least one serving cell.

In some aspects, a non-transitory computer-readable medium stores one or more instructions for wireless communication that, when executed by one or more processors of a base station, cause the base station to: receive a MAC-CE to indicate beam failure information for one or more serving cells, wherein the beam failure information is associated with at least one of a first TRP or a second TRP of the one or more serving cells; and perform a beam failure recovery operation based at least in part on the beam failure information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of multi-TRP communication (sometimes referred to as multi-panel communication), in accordance with various aspects of the present disclosure.

FIGS. 7-11 are diagrams illustrating examples of multi-TRP BFR MAC-CEs indicating beam failure information, in accordance with various aspects of the present disclosure.

FIG. 13 is a diagram illustrating an example process performed, for example, by a base station, in accordance with various aspects of the present disclosure.

DETAILED DESCRIPTION

Figure 1:
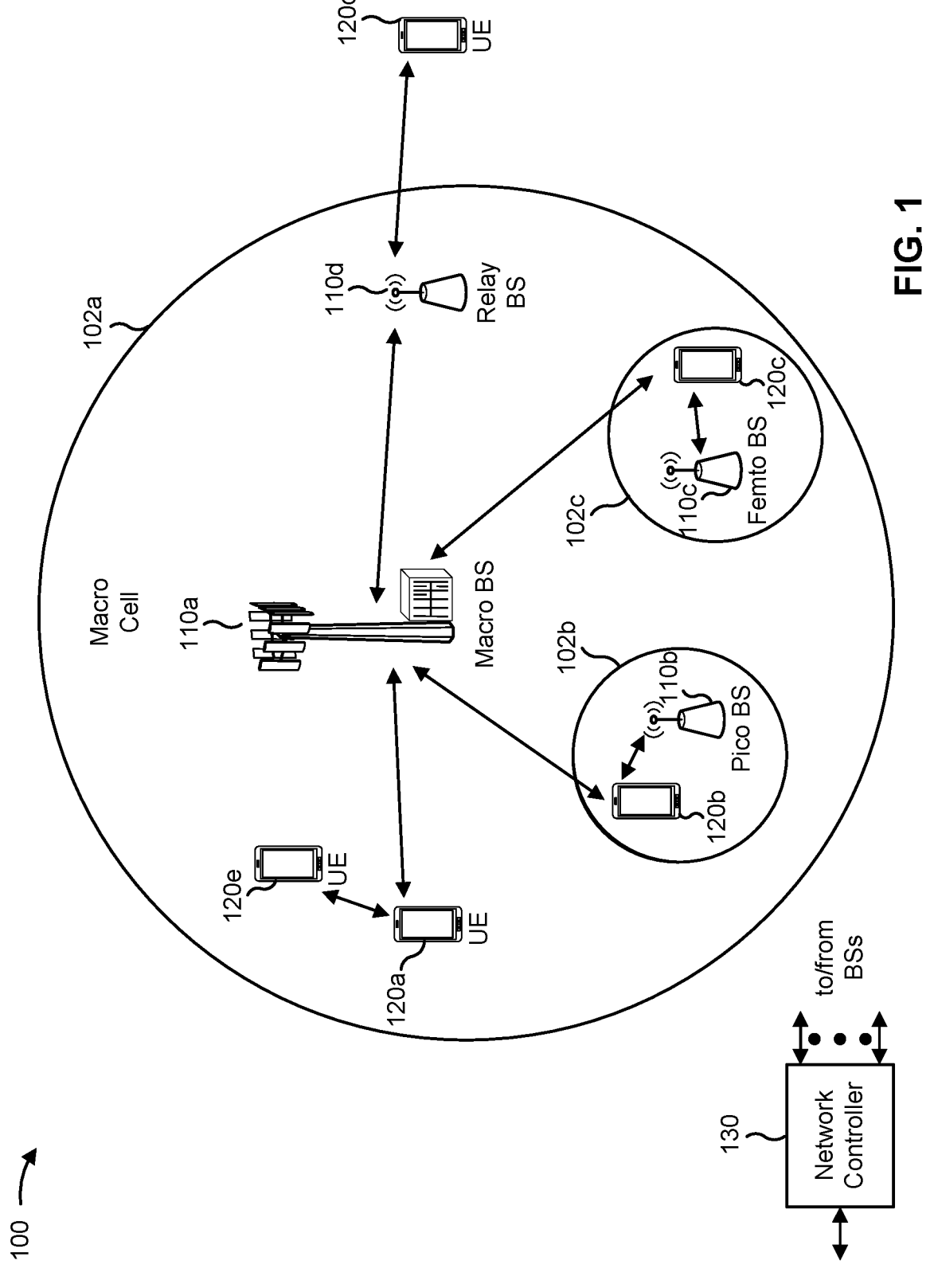
FIG. 1 is a diagram illustrating an example of a wireless network, in accordance with various aspects of the present disclosure.

Beam failure recovery (BFR) and beam failure recovery requests (BFRQ) may be used in wireless communications to facilitate recovery from beam failures. The term "beam failure," as used herein, may refer to a failure of a beam, poor and/or degraded channel conditions on a beam, failed transmissions on a beam, a beam having one or more parameters that do not satisfy a threshold, and/or the like. The UE may request beam failure recovery by transmitting an indication of a candidate beam, a new synchronization signal (SS) block or a channel state information reference signal (CSI-RS) and initiating a random access control channel (RACH) procedure. In some aspects, the indication may indicate one or more serving cells associated with the beam failure. For example, the indication may indicate one or more serving cells and corresponding candidate beams, SS blocks, or CSI-RSs.

Generally, a BFR procedure may be performed per serving cell. For example, as described above, the indication of beam failure may indicate a serving cell for which beam failure occurred and may indicate a candidate beam/SS block/CSI-RS for the serving cell. However, in a multi transmit-receive point (TRP) deployment, a single serving cell may be provided by two TRPs, which may be associated with distinct communication links with the UE. Thus, if beam failure instance indications received from a lower layer of the UE accumulate to satisfy a beam failure threshold, some beam failure detection procedures (e.g., per serving cell beam failure detection procedures) cannot detect which TRP is associated with a beam failure in multi-TRP operation. Hence, per-TRP beam recovery cannot be supported. If only per-serving cell beam failure detection is supported, the BS may need to perform beam recovery for both TRPs, or take other inefficient action to remedy beam failure.

Techniques and apparatuses described herein provide configuration and signaling of beam failure information in a medium access control (MAC) control element (CE), which may be referred to herein as a multi-TRP BFR MAC CE. For example, the multi-TRP BFR MAC-CE may include a bitmap that indicates one or more serving cells associated with a beam failure associated with at least one of a first TRP or a second TRP. In some aspects, the multi-TRP BFR MAC-CE indicates whether the beam failure is associated with the first TRP or the second TRP. In some aspects, the multi-TRP BFR MAC-CE indicates a candidate beam for the first TRP or the second TRP, and indicates whether the candidate beam is associated with the first TRP or the second TRP. In this way, the UE can signal information indicating a TRP associated with a beam issue in a multi-TRP deployment, thereby facilitating TRP-specific beam recovery. For example, beam recovery may be performed via a link associated with a remaining TRP (e.g., a TRP associated with a non-failed link) of the multi-TRP deployment. In this way, TRP-specific beam recovery is enabled, which improves utilization of network resources and improves multi-TRP communication.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
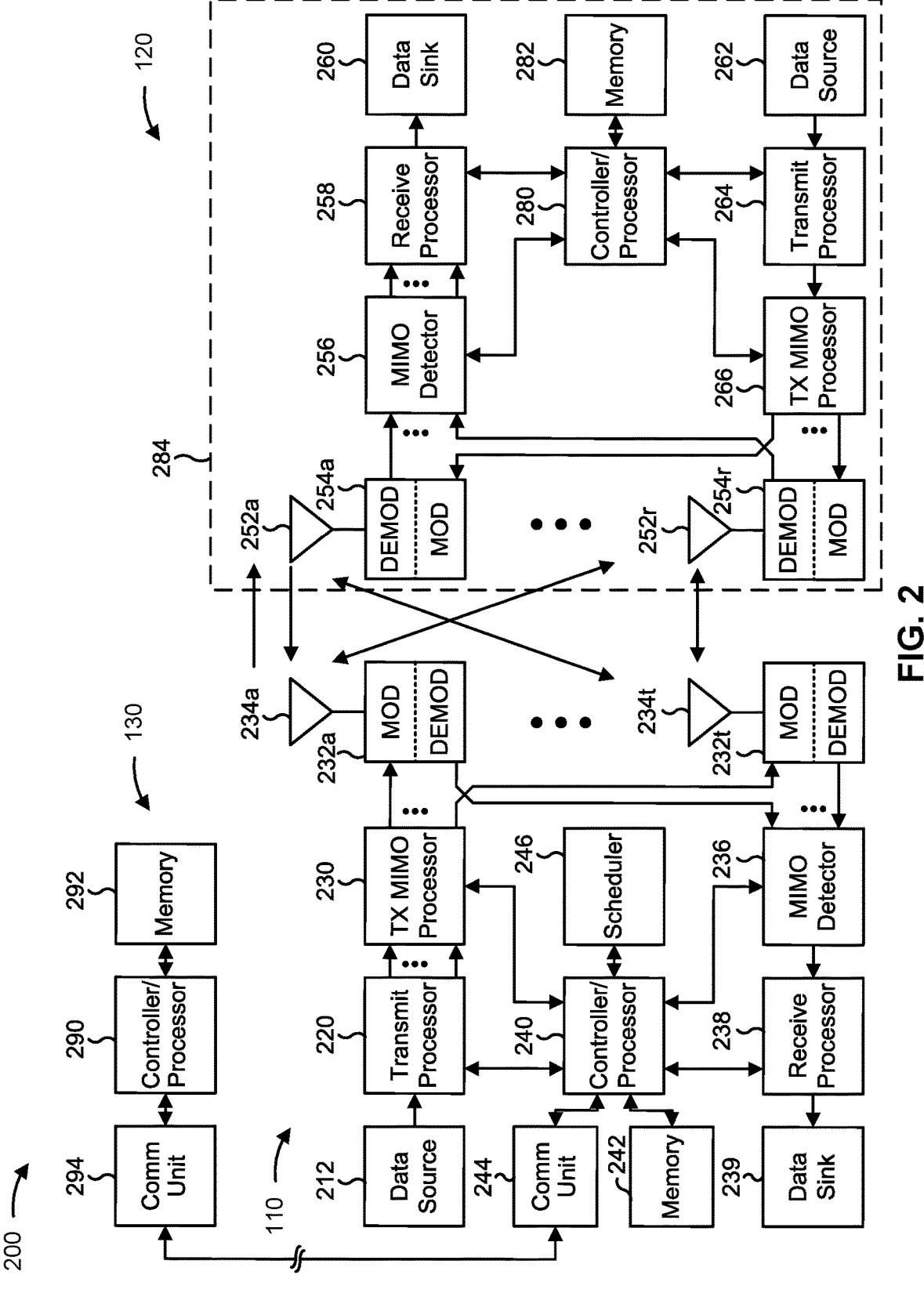
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-13.

Controller/processor 240 of base station 110, controller/processor 280 of UE 120, and/or any other component(s) of FIG. 2 may perform one or more techniques associated with MAC signaling for TRP-specific BFR, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE includes means for configuring a MAC-CE to indicate beam failure information for one or more serving cells, wherein the beam failure information is associated with at least one of a first TRP or a second TRP of the one or more serving cells; or means for transmitting the MAC-CE to a base station via at least one serving cell. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for configuring a bitmap in the MAC-CE, wherein a first group of bits of the bitmap indicates whether a beam failure has occurred for the first TRP on an associated serving cell of the one or more serving cells, and wherein a second group of bits of the bitmap indicates whether a beam failure has occurred for the second TRP on an associated serving cell of the one or more serving cells.

In some aspects, the UE includes means for configuring, in the MAC-CE, one or more bytes associated with the one or more serving cells, wherein a byte, of the one or more bytes, associated with a TRP, of the first TRP and the second TRP, and a serving cell, of the one or more serving cells, includes a first field indicating whether the byte includes an indication of a new beam (e.g., a beam status) for the TRP and the serving cell, and a second field for the indication of the new beam.

In some aspects, the UE includes means for configuring the MAC-CE based at least in part on the beam failure occurring for the special cell, wherein the MAC-CE omits a field indicating whether a byte includes an indication of a new beam for the special cell based at least in part on the beam failure occurring for the special cell.

In some aspects, the UE includes means for configuring a bitmap in the MAC-CE, wherein a first group of bits of the bitmap indicates whether a beam failure has occurred on an associated serving cell of the one or more serving cells, wherein a second group of bits of the bitmap indicates whether a subsequent set of bytes indicates a single new beam or multiple new beams, and wherein a third group of bits of the bitmap indicates whether the single new beam is associated with the first TRP or the second TRP.

In some aspects, the UE includes means for configuring, in the MAC-CE, the subsequent set of bytes associated with the serving cell, wherein a byte, of the subsequent set of bytes, associated with a TRP, of the first TRP and the second TRP, and the serving cell includes a first field indicating whether the byte includes an indication of a new beam (e.g., a beam status) for the TRP and the serving cell, and a second field for the indication of the new beam.

In some aspects, the UE includes means for configuring a byte in the MAC-CE, wherein a first field of the byte indicates whether a subsequent set of bytes indicates a single new beam or multiple new beams for a serving cell of the one or more serving cells, wherein a second field of the byte indicates whether the single new beam is associated with the first TRP or the second TRP of the serving cell, and wherein a third field of the byte indicates a serving cell identifier of the serving cell.

In some aspects, the UE includes means for configuring, in the MAC-CE, the subsequent set of bytes associated with the serving cell, wherein a byte, of the subsequent set of bytes, associated with a TRP, of the first TRP and the second TRP, and a serving cell, of the one or more serving cells, includes a first field indicating whether the byte includes an indication of a new beam (e.g., a beam status) for the TRP and the serving cell, and a second field for the indication of the new beam.

In some aspects, the base station includes means for receiving a MAC-CE to indicate beam failure information for one or more serving cells, wherein the beam failure information is associated with at least one of a first TRP or a second TRP of the one or more serving cells; or means for performing a beam failure recovery operation based at least in part on the beam failure information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
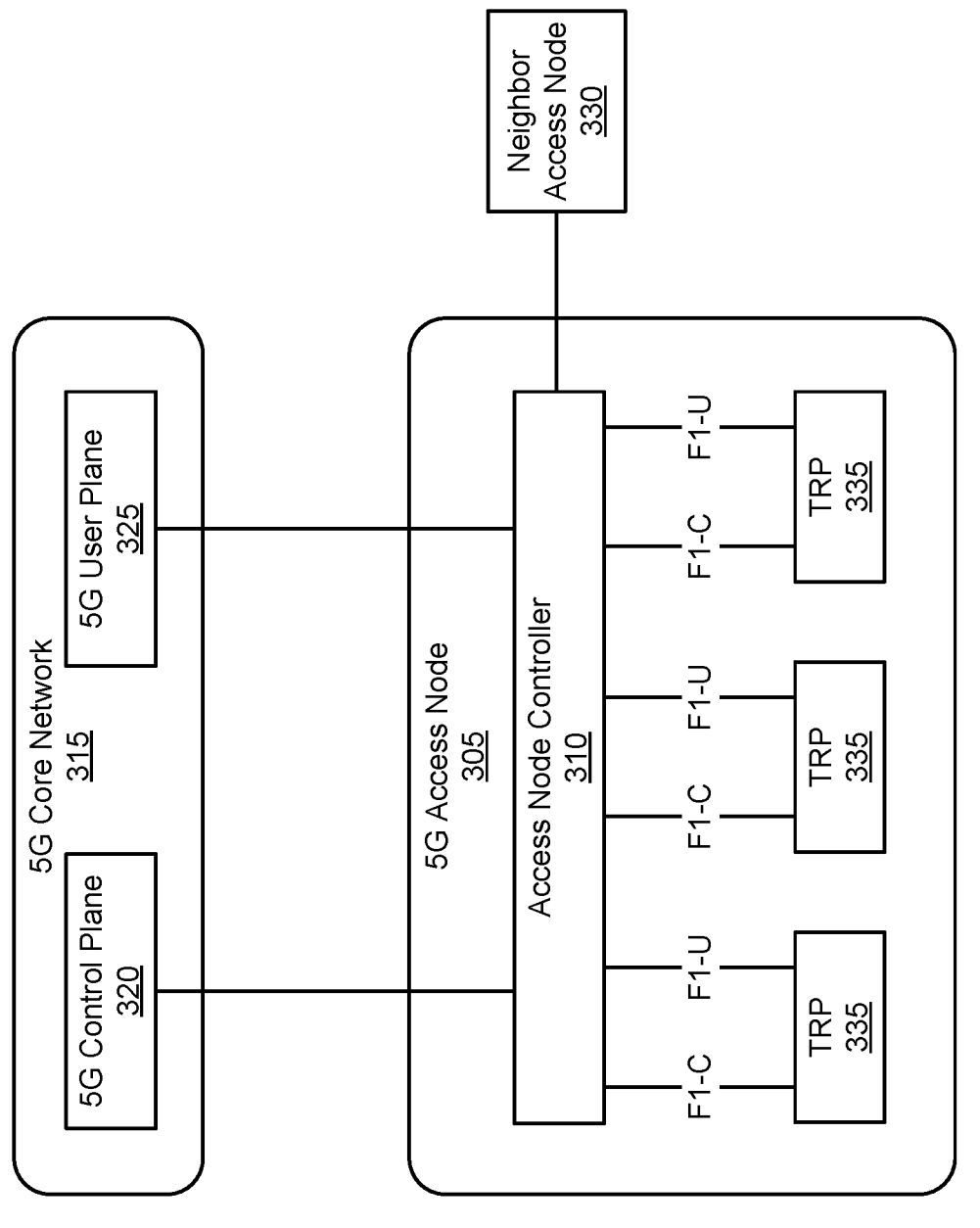
FIG. 3 illustrates an example logical architecture of a distributed RAN, according to aspects of the present disclosure.

FIG. 3 illustrates an example logical architecture of a distributed RAN 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335. Generally, a TRP 335 may handle physical layer logical functions of distributed RAN 300. In some aspects, a TRP 335 may receive MAC signaling, such as a MAC control element relating to beam failure, and the TRP 335 may forward the MAC signaling to access node controller 310 or may handle the MAC signaling locally.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-colocation (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

FIG. 4 is a diagram illustrating an example 400 of multi-TRP communication (sometimes referred to as multi-panel communication), in accordance with various aspects of the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

If beam failure occurs on one of the links between the UE 120 and the TRPs 405, the UE 120 may need to indicate such a beam failure to a BS 110 associated with the TRPs 405. For example, the UE 120 may use MAC signaling, such as a MAC control element (CE), to indicate the beam failure. However, traditional MAC-CEs used to indicate beam failure may not provide information regarding a TRP associated with a beam failure. Since both TRPs may be associated with the same MAC layer logical entity, this ambiguity may lead to inappropriate mitigation actions, network inefficiency, and improper utilization of multi-TRP resources. Some techniques and apparatuses described herein enable configuration and provision of a MAC-CE (e.g., a multi-TRP BFR MAC-CE) indicating a TRP associated with a beam failure. Thus, the network can take appropriate action to mitigate the beam failure, such as a beam failure recovery action.

As indicated above, FIG. 4 is provided as an example. Other examples may differ from what is described with respect to FIG. 4.

Figure 5:
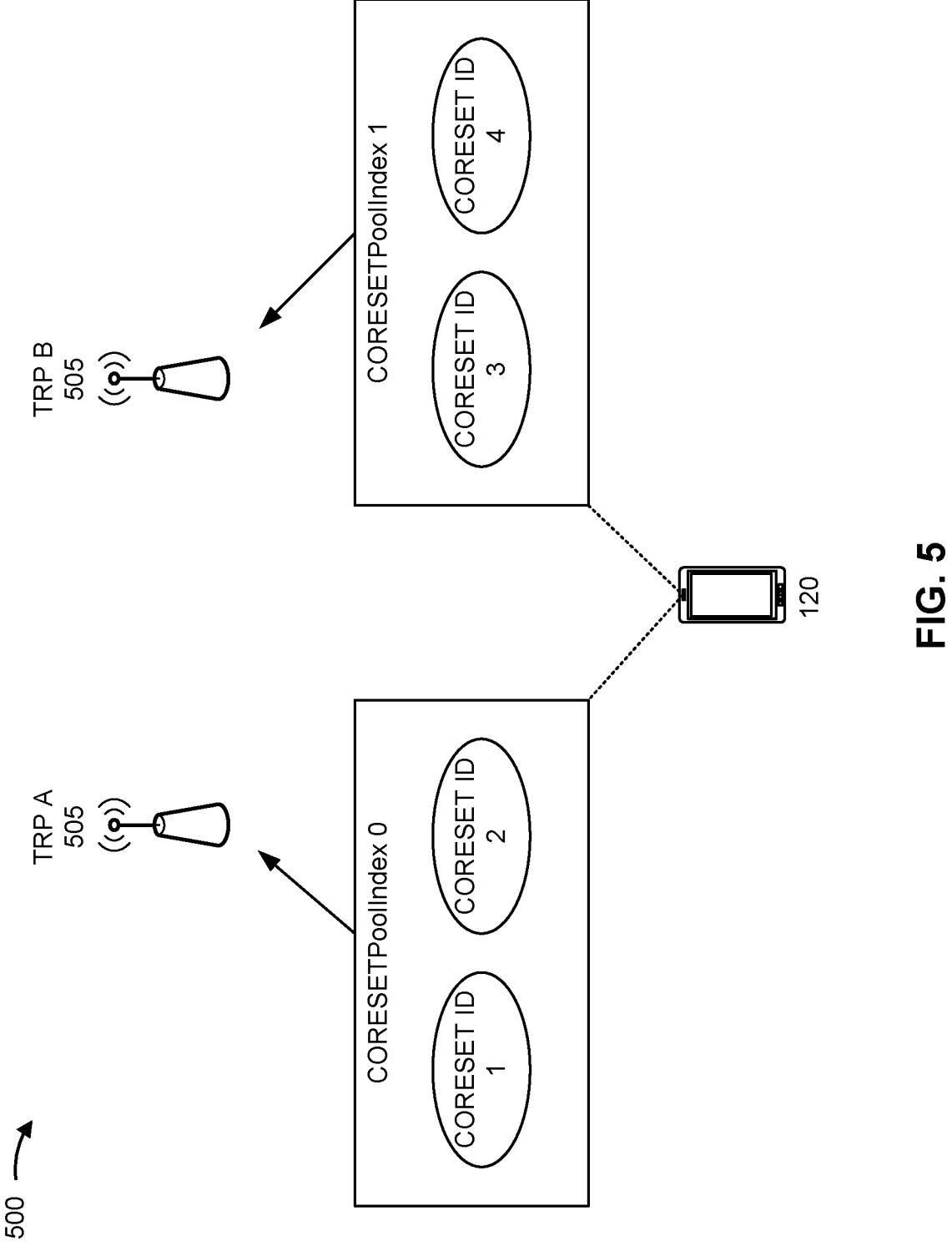
FIG. 5 is a diagram illustrating an example of TRP differentiation at a UE based at least in part on a CORESET pool index in accordance with various aspects of the present disclosure.

FIG. 5 is a diagram illustrating an example 500 of TRP differentiation at a UE based at least in part on a control resource set (CORESET) pool index, in accordance with various aspects of the present disclosure. In some aspects, a CORESET pool index (or CORESETPoolIndex) value may be used by a UE (a UE 120) to identify a TRP associated with an uplink grant received on a PDCCH.

A CORESET is a control region that may be structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using radio resource control (RRC) signaling to indicate a frequency domain region (for example, a quantity of resource blocks) or a time domain region (for example, a quantity of symbols) for the CORESET.

As illustrated in FIG. 5, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 5, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 505. As an example, and as illustrated in FIG. 5, a first TRP 505 (TRP A) may be associated with CORESET pool index 0 and a second TRP 505 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

As indicated above, FIG. 5 is provided as an example. Other examples may differ from what is described with respect to FIG. 5.

Figure 6:
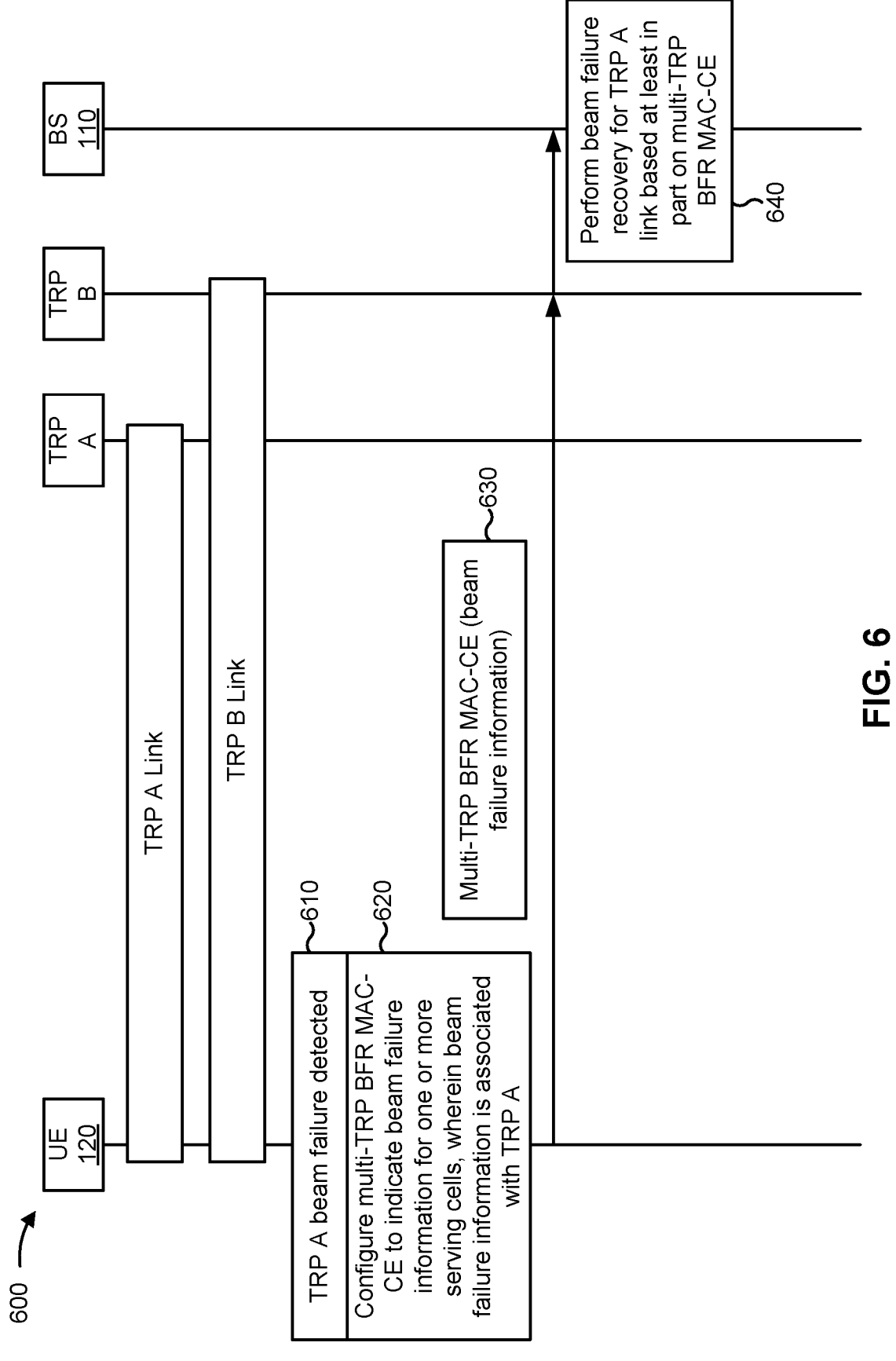
FIG. 6 is a diagram illustrating an example of signaling associated with beam failure recovery for a multi-TRP deployment using a multi-TRP BFR MAC-CE, in accordance with various aspects of the present disclosure.

FIG. 6 is a diagram illustrating an example 600 of signaling associated with beam failure recovery for a multi-TRP deployment using a multi-TRP BFR MAC-CE, in accordance with various aspects of the present disclosure. As shown, example 600 includes a UE 120, a BS 110, and TRPs A and B. TRPs A and B may include TRP 335, TRP 405, or TRP 505. BS 110 may handle higher-layer functions for TRPs A and B. For example, BS 110 may be a gNB associated with TRPs A and B, an access node controller 310, associated with TRPs A and B, or the like. BS 110 may provide one or more serving cells, for which physical-layer communications may be handled by TRPs A and B.

As shown, the UE 120 is associated with a link with TRP A and a link with TRP B. The links between the UE and the TRPs A and B may be maintained using beam pairs. A beam pair may include a UE-side beam and a BS-side beam, such as a UE-side transmit beam and a B S-side receive beam for uplink communications or a UE-side receive beam and a BS-side transmit beam for downlink communications.

As shown by reference number 610, the UE 120 may detect beam failure on the link with TRP A. For example, the UE 120 may determine a failure of a beam, poor and/or degraded channel conditions on a beam, failed transmissions on a beam, a beam having one or more parameters that do not satisfy a threshold, and/or the like. As another example, the UE 120 may determine that a number of beam failure notifications from a lower layer of the UE 120 satisfies a threshold within a configured timer, and may therefore declare beam failure on the link with TRP A.

As shown by reference number 620, the UE 120 may configure a MAC-CE to indicate beam failure information for one or more serving cells, wherein the beam failure information is associated with TRP A. The MAC-CE may be referred to herein as a multi-TRP BFR MAC-CE. The beam failure information may indicate whether the beam failure is associated with TRP A or TRP B. For example, the beam failure information may indicate which TRP, of a plurality of TRPs associated with a serving cell, is associated with a beam failure. In example 600, the multi-TRP BFR MAC-CE indicates that beam failure has occurred with regard to a serving cell provided by BS 110, and indicates that the beam failure is associated with TRP B. For more detailed description of the multi-TRP BFR MAC-CE shown by reference number 620, refer to FIGS. 7-11.

In some aspects, the UE 120 may identify a candidate beam for the link associated with TRP A. For example, the UE 120 may identify the candidate beam based at least in part on a measurement (e.g., determined by measuring synchronization signal blocks of beams transmitted by TRP A, or the like) associated with the candidate beam satisfying a threshold, or based at least in part on the candidate beam being a best beam of a plurality of beams measured by the UE 120. If the UE 120 identifies a candidate beam for the link associated with TRP A, then the UE 120 may configure the multi-TRP BFR MAC-CE to indicate the candidate beam for the link associated with TRP A, as described in more detail in connection with FIGS. 7-12. If the UE 120 does not identify a candidate beam for the like associated with TRP A, then the UE 120 may configure the multi-TRP BFR MAC-CE to omit information indicating the candidate beam (e.g., the multi-TRP BFR MAC-CE may indicate no candidate beam). The information included in the multi-TRP BFR MAC-CE that indicates a candidate beam or no candidate beam is referred to herein as a beam status. A beam status for serving cell N and TRP Y is denoted by Beam status—$C_{N-Y}$, as shown in FIGS. 7-11. If the beam status indicates no candidate beam, then a field for the beam status may include reserved bits (R).

As shown by reference number 630, the UE 120 may transmit the multi-TRP BFR MAC-CE. For example, the UE 120 may transmit the multi-TRP BFR MAC-CE via the link associated with TRP B. Generally, the UE 120 may transmit the multi-TRP BFR MAC-CE via a non-failed link between the UE 120 and the BS 110. As shown, the TRP B may relay the multi-TRP BFR MAC-CE to the BS 110. For example, the TRP B may provide the multi-TRP BFR MAC-CE to a higher layer (e.g., a MAC layer) of the BS 110 for handling by the BS 110.

As shown by reference number 640, the BS 110 may perform beam failure recovery for the failed link (e.g., the link associated with TRP A) based at least in part on the multi-TRP BFR MAC-CE. For example, since the multi-TRP BFR MAC-CE indicates that the beam failure is associated with the link provided by TRP A, the BS 110 may perform beam failure recovery that is specific to TRP A. Thus, the BS 110 may improve utilization of network resources that would otherwise be used to perform beam recovery for all TRPs associated with the BS 110 based at least in part on a failure of a single TRP.

As indicated above, FIG. 6 is provided as an example. Other examples may differ from what is described with regard to FIG. 6.

FIGS. 7-11 are diagrams illustrating examples of multi-TRP BFR MAC-CEs indicating beam failure information, in accordance with various aspects of the present disclosure. FIGS. 7-11 show examples 700, 800, 900, 1000, 1100, and 1105 of the MAC-CE configured as shown by reference number 620 of FIG. 6.

Figure 7:
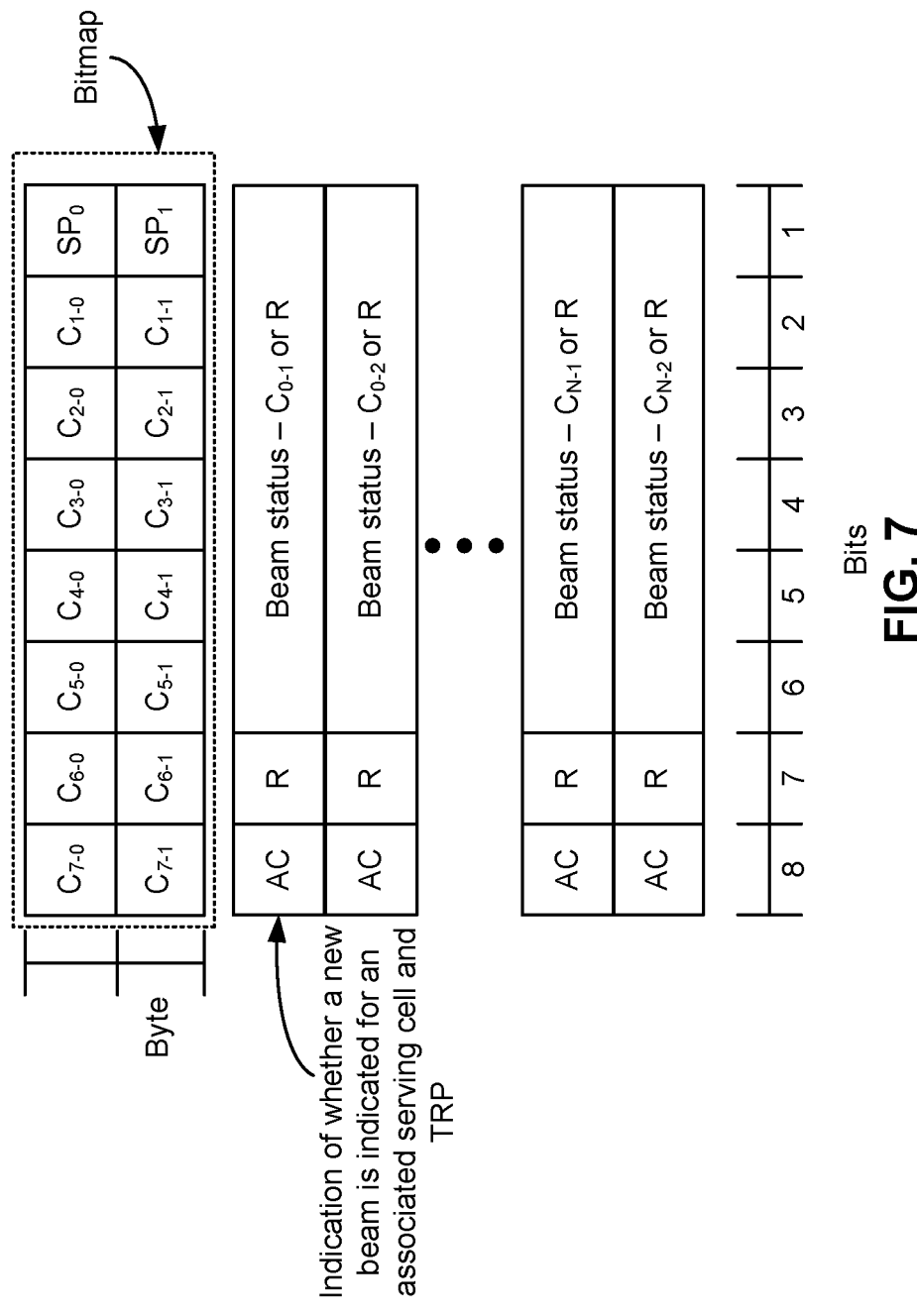

In some aspects, a bitmap may indicate a serving cell and TRP associated with a beam failure. As shown in FIG. 7, in some examples, the multi-TRP BFR MAC-CE may include a plurality of bytes or 8-bit octets. One or more bytes of the multi-TRP BFR MAC-CE may include the bitmap. A first group of bits (e.g., a first byte) of the multi-TRP BFR MAC-CE may be associated with a first TRP and a second group of bits (e.g., a second byte) of the multi-TRP BFR MAC-CE may be associated with a second TRP. For example, each bit in the first group of bits may indicate whether a beam failure has occurred for a corresponding serving cell with regard to the first TRP, and each bit in the second group of bits may indicate whether a beam failure has occurred for a corresponding serving cell with regard to the second TRP. For example, each bit in the bitmap may correspond to a respective serving cell of the plurality of serving cells (e.g., bit $C_1$ may correspond to first serving cell, bit $C_2$ may correspond to a second serving cell, and so on). If bit $C_1$-0 is activated or set to a particular value, this may indicate beam failure with regard to a serving cell 1 on TRP 1. In some aspects, the multi-TRP BFR MAC-CE of example 700 may be used to indicate beam failure on a secondary cell (SCell) of the UE 120.

The multi-TRP BFR MAC-CE may include additional bytes to indicate candidate beam information for the plurality of serving cells. Each additional byte may be associated with a respective serving cell and TRP of the plurality of serving cells and the first TRP and the second TRP. Each additional byte may include an "AC" field of one or more bits. The value indicated by the AC field may be indicate whether a candidate beam is indicated for the serving cell and TRP associated with the additional byte. For example, a 1-value for the AC field in the byte associated with cell 1 (e.g., $C_1$) and the first TRP may indicate that the byte includes a candidate beam indication in another field for cell 1 and the first TRP, and a 0-value for the AC field in the byte associated with cell 1 and the first TRP may indicate that the byte does not include a candidate beam indication for cell 1 and the first TRP. As another example, a 0-value for the AC field in the byte associated with cell 1 (e.g., $C_1$) and the first TRP may indicate that the byte includes a candidate beam indication in another field for cell 1 and the first TRP, and a 1-value for the AC field in the byte associated with cell 1 and the first TRP may indicate that the byte does not include a candidate beam indication for cell 1 and the first TRP. N may be equal to a number of cells for which beam failure has been signaled based at least in part on the bitmap. For example, if four cell/TRPs are associated with beam failure, then there may be 4 candidate beam indicators (if candidate beams have been In this way, if the value indicated by an AC field for a byte indicates that the byte does not include a candidate beam indication, a base station 110 can stop reading the byte after reading the AC field, which conserves processing and memory resources and reduces latency in processing the multi-TRP BFR MAC-CE. Each additional byte may also include one or more reserved bits, denoted by "R."

In some aspects, a byte may include an SP bit. An SP bit may indicate whether a beam failure is associated with a special cell of a MAC entity. A special cell may include a primary cell (PCell) of a master cell group (MCG) of a UE, or a primary secondary cell (PSCell) of a secondary cell group (SCG) of the UE. In some aspects, the SP field is set to a value (e.g., 1) to indicate that beam failure is detected for an SpCell only when a multi-TRP BFR MAC-CE or a truncated BFR MAC CE is to be included in a MAC protocol data unit (PDU) as part of a random access procedure. In example 700, the multi-TRP BFR MAC-CE includes two SP bits: a first SP bit corresponding to a first TRP and a second SP bit corresponding to a second TRP.

Figure 8:
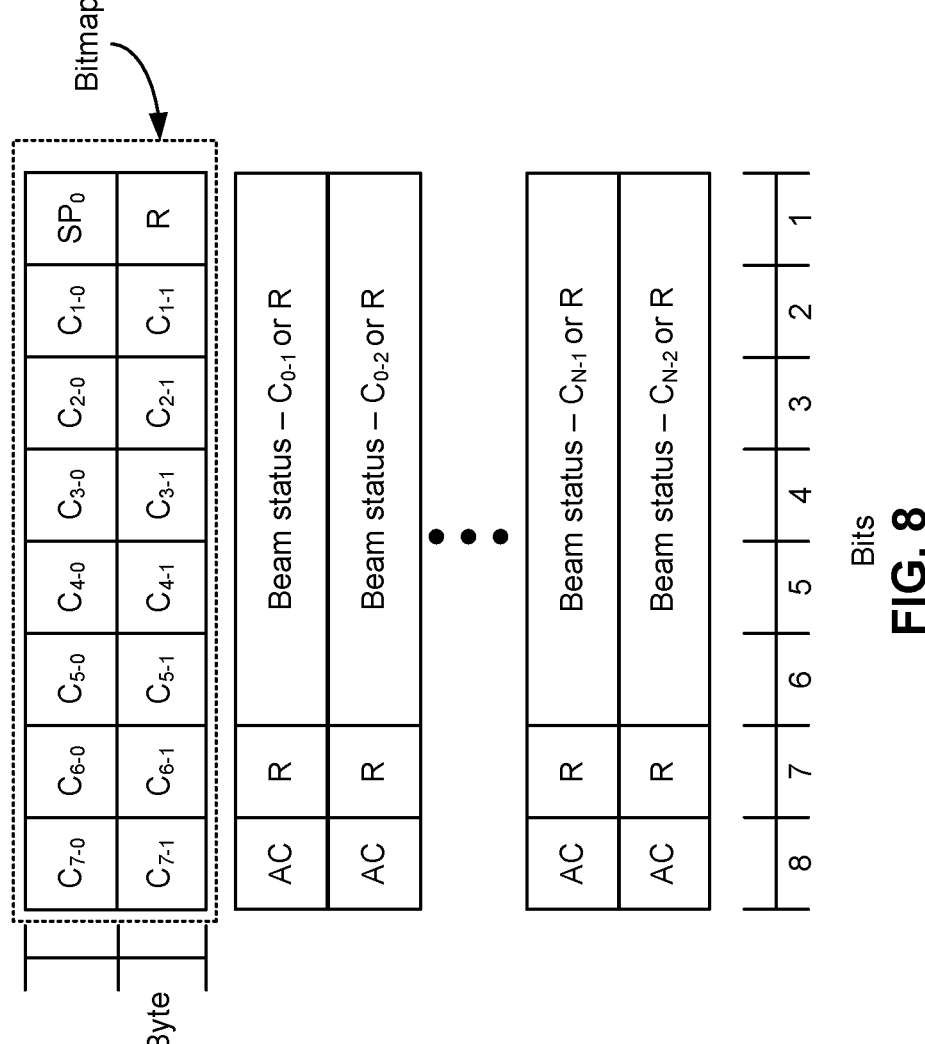

Example 800 of FIG. 8 shows an example of a multi-TRP BFR MAC-CE that can be used to indicate beam failure for an SPcell. For example, if BFR is triggered for a TRP in an SpCell, the UE may transmit the multi-TRP BFR MAC-CE with an SP bit (e.g., SP0) set to a value. Furthermore, in some aspects, the multi-TRP BFR MAC-CE may omit SP1. For example, the multi-TRP BFR MAC-CE may include only SP0, and may include a reserved bit (R) in place of SP1. By including a single SP bit, the UE 120 can report a per-cell beam failure for an SpCell, rather than reporting per-TRP beam failure for the SpCell. This may be beneficial where the SpCell is particularly important, and may conserve multi-TRP BFR MAC-CE overhead relative to specifying per-TRP beam failure information that indicates whether each TRP is associated with an SpCell (for example, since the network may want to recover only the SpCell from a single-TRP configuration, the second TRP and the associated candidate beam in the SpCell may not be crucial at an initial stage). In some aspects, in example 800, the multi-TRP BFR MAC-CE may omit candidate beam information. For example, the UE may transmit the multi-TRP BFR MAC-CE with the SP bit indicating a failure of an SpCell via a random access channel (RACH). Since the UE 120 selects a best beam with a RACH association to perform a RACH procedure, the indication of the candidate beam may be redundant. Thus, the UE 120 may conserve resources that would otherwise be used to provide the indication of the candidate beam.

Figure 9:
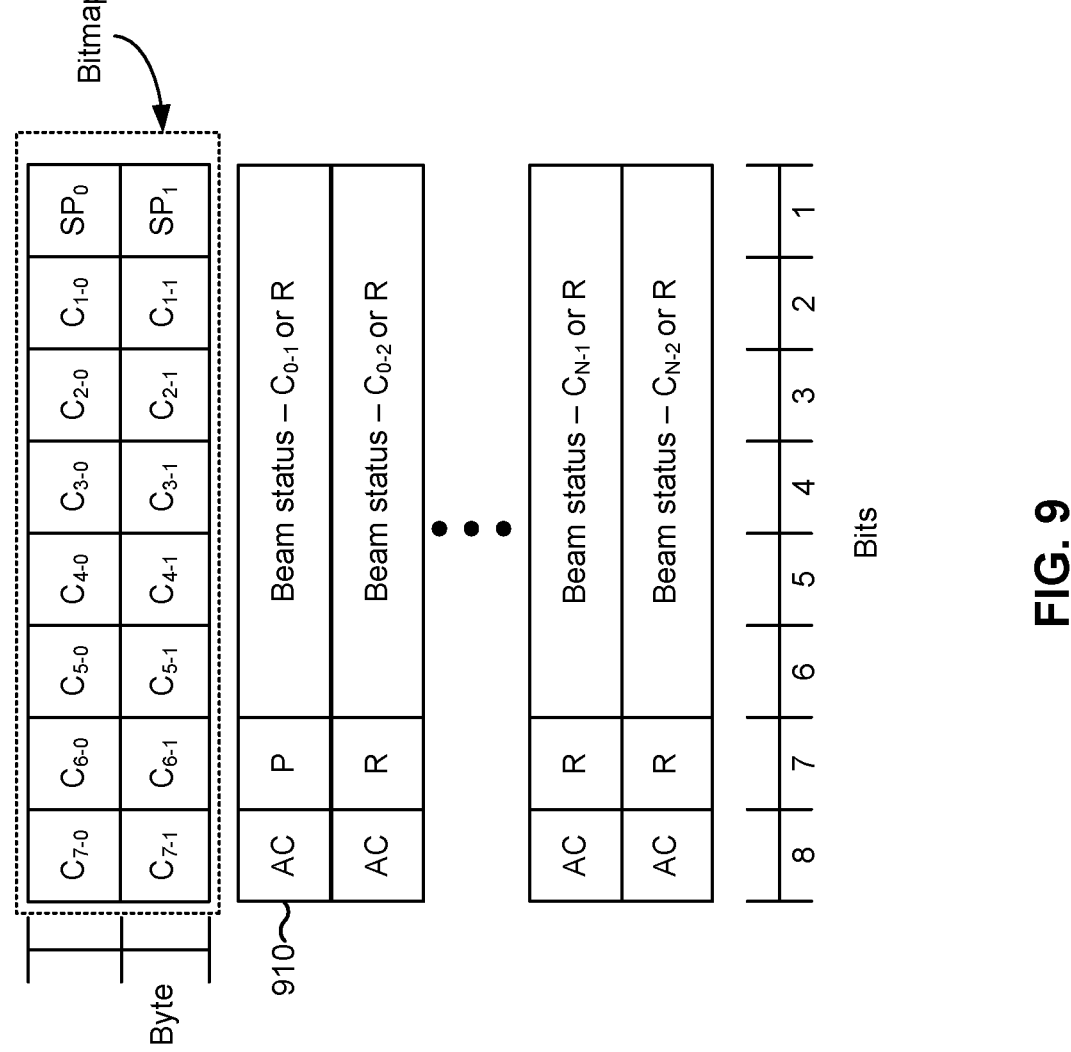

Example 900 of FIG. 9 shows an example where the multi-TRP BFR MAC-CE indicates that a same candidate beam is detected for both TRPs of a cell. In example 900, a "P" bit, associated with a candidate beam identifier, may indicate whether the same beam (or no beam) is to be used for both TRPs of a serving cell if both of the TRPs are associated with beam failure, as indicated by the bitmap. For example, if P is set to 1, a byte following a byte 910 that includes P may not be present if both TRPs associated with the serving cell associated with byte 910 are associated with beam failure. Thus, the multi-TRP BFR MAC-CE may reduce overhead if both TRPs are associated with a same candidate beam, or if no candidate beam is identified for both TRPs.

Figure 10:
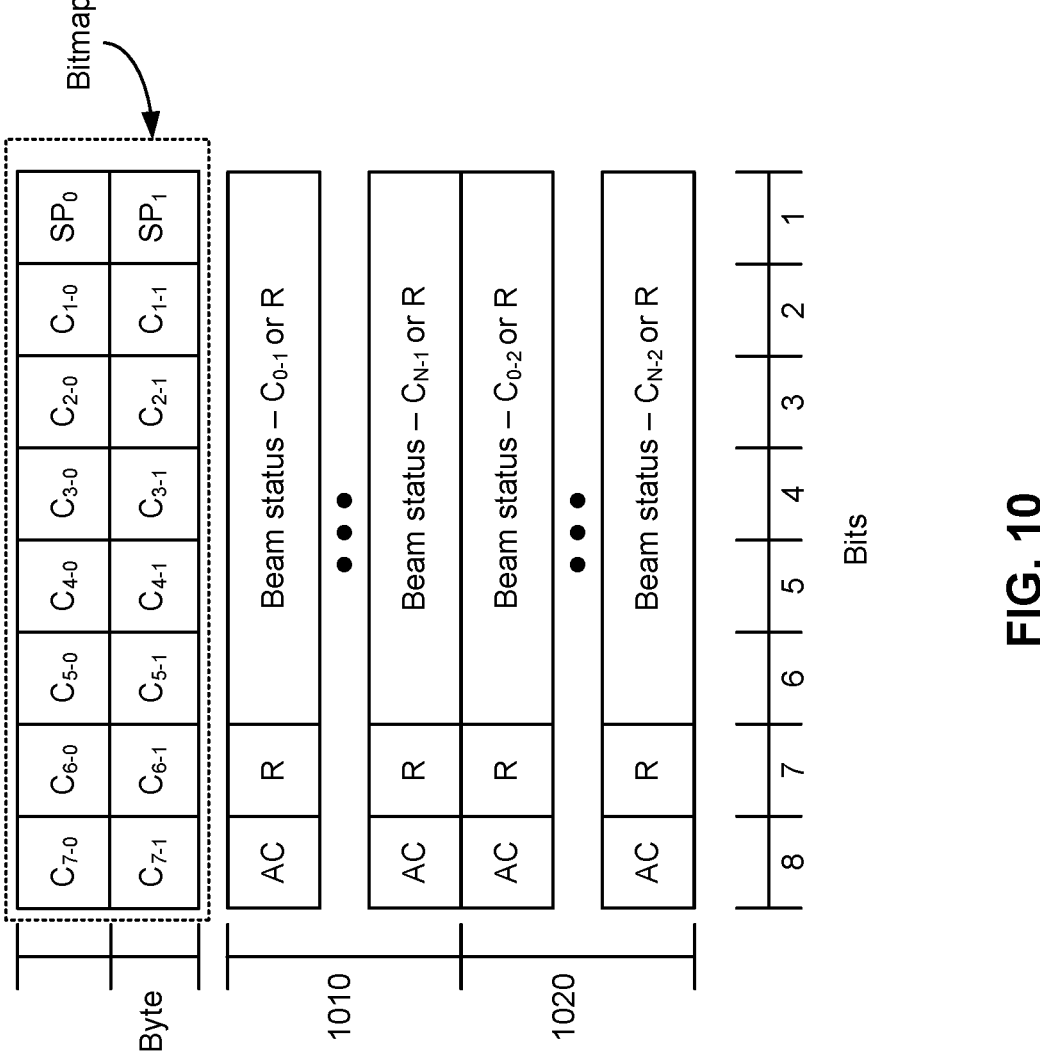

Example 1000 of FIG. 10 shows an example where indications of beam statuses are prioritized based at least in part on corresponding TRPs. In example 1000, the UE 120 may report a candidate beam (if detected) for the first failed TRP of each serving cell (if any) in a first set of bytes 1010, and may subsequently report a candidate beam (if detected) for the second failed TRP of each serving cell (if any) in a second set of bytes 1020. For example, the UE 120 may prioritize beam statuses associated with first failed TRPs over beam statuses associated with second failed TRPs. In some aspects, a first failed TRP is a TRP associated with a first control resource set (CORESET) pool index (e.g., 0) and a second failed TRP is a TRP associated with a second CORESET pool index (e.g., 1). In some aspects, a first failed TRP is a primary TRP, and a second failed TRP is a non-primary TRP. In some aspects, a first failed TRP is a TRP that transmits control signaling or broadcast signaling for a common message. Thus, beam failure recovery for the first failed TRP may be prioritized over beam failure recovery for the second failed TRP. Prioritizing beam failure recovery for the first failed TRP may improve operation of the network, and may be beneficial in situations where uplink resources are limited (e.g., for a truncated multi-TRP BFR MAC-CE and/or when an uplink grant for the multi-TRP BFR MAC-CE is small). For example, the primary TRP (e.g., the first failed TRP) may generally carry control signaling (such as a cell-defining SSB), so reliability of the primary TRP may be more important than reliability of the non-primary TRP. Furthermore, the network may generally first configure the UE 120 with a single TRP (e.g., the primary TRP), and if conditions warrant the addition of a second TRP, then a non-primary (e.g., secondary) TRP may be added. In this sense, it is beneficial to prioritize recovery of the primary TRP over the secondary TRP. Thus, in the case of a truncated MAC-CE, reporting the candidate beam for the first/primary TRP of each failed SCell first is beneficial, if uplink grants for the MAC-CE are small.

Figure 11:
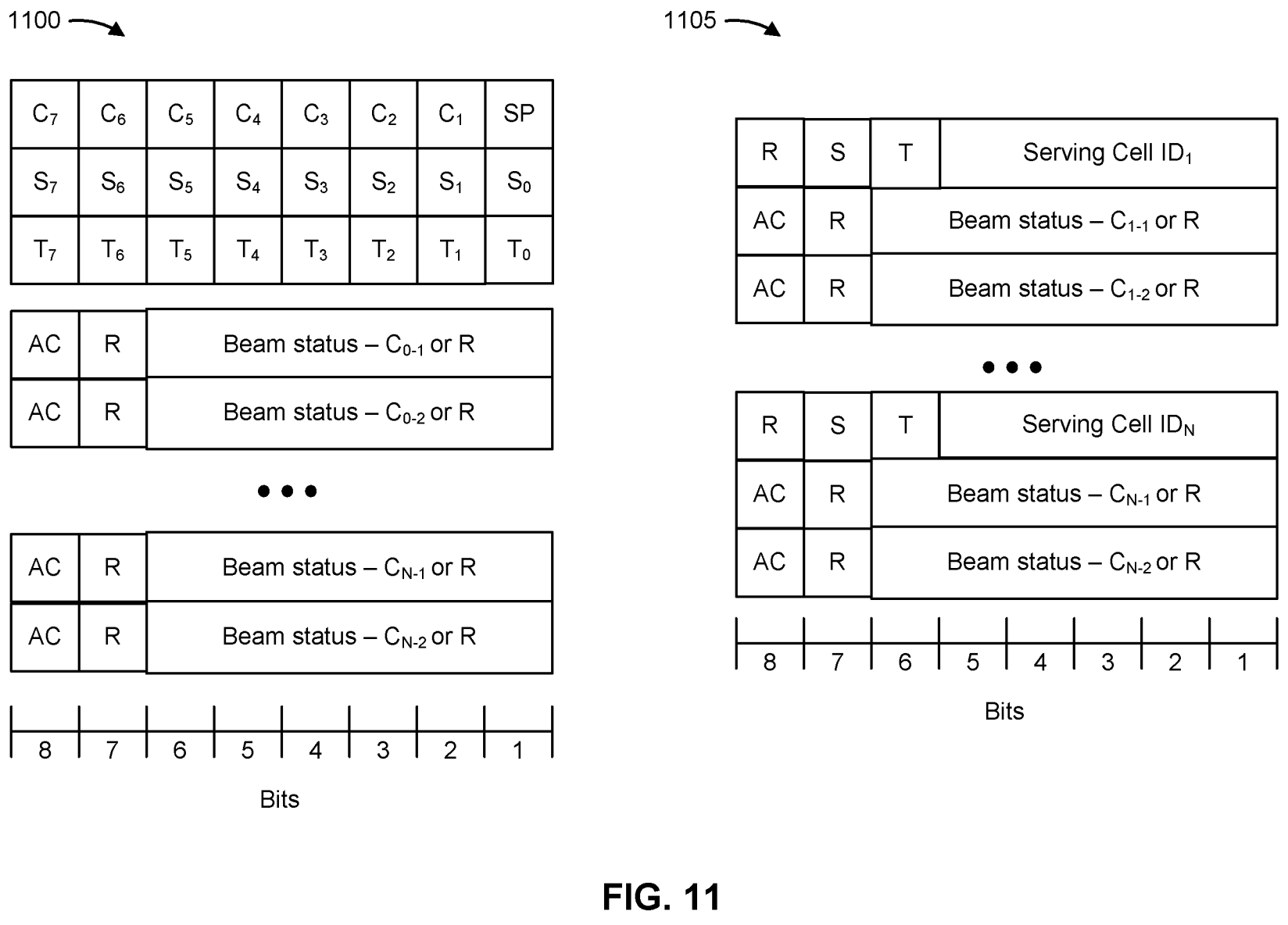

Examples 1100 and 1105 of FIG. 11 shows an example where a first group of bits of the bitmap indicates whether a beam failure has occurred on an associated serving cell and second group of bits of the bitmap indicates whether a subsequent set of bytes indicates a single beam status or multiple beam statuses. Furthermore, if the second group of bits indicates a single beam status, a third group of bits may indicate whether the single beam status is associated with a first TRP or a second TRP. For example, the first group of bits is denoted by C, the second group of bits is denoted by S, and the third group of bits is denoted by T. In example 1100, S and T are provided as part of the bitmap that includes C. In example 1105, S and T are provided in association with a serving cell identifier to which S and T apply, and one or more beam statuses are provided in association with the serving cell identifier (e.g., for one or more TRPs associated with the serving cell identifier). A first value of the S field (e.g., 0) may indicate that a single beam status in a subsequent set of bytes is present, and that the BS 110 is to check the T field. A second value of the S field (e.g., 1) may indicate that multiple beam statuses are present in a subsequent set of bytes, and thus the BS 110 can ignore the T field. The T field may be valid only if the S field is set to the first value. If T is set to a first value, T indicates that the single beam status is associated with a first TRP, and if T is set to a second value, T indicates that the single beam status is associated with a second TRP. For example, the first value and the second value of T may correspond to CORESET pool indexes of the first TRP and the second TRP.

As indicated above, FIGS. 7-11 are provided as one or more examples. Other examples may differ from what is described with regard to FIGS. 7-11.

Figure 12:
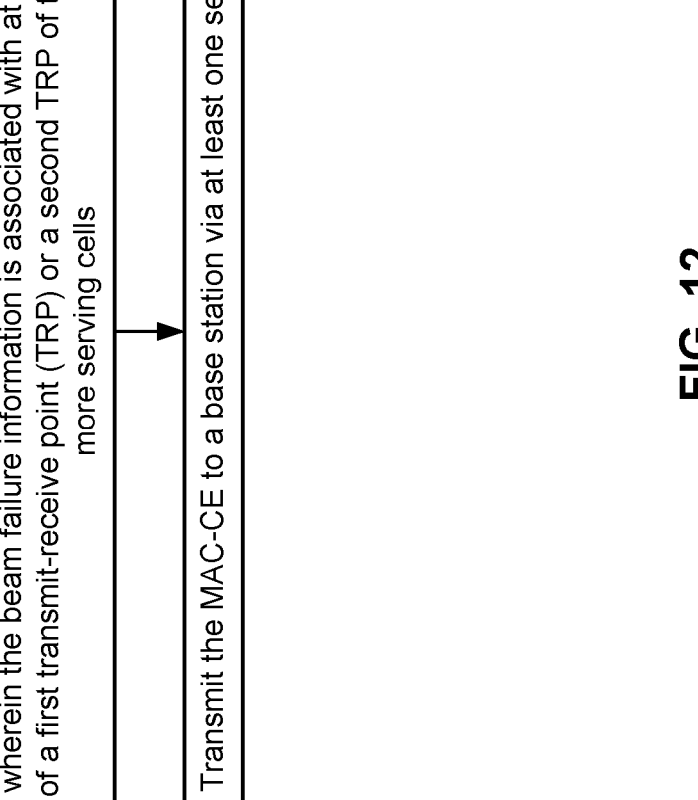
FIG. 12 is a diagram illustrating an example process performed, for example, by a UE, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120) performs operations associated with beam failure recovery medium access control signaling for a multi transmit-receive point system.

As shown in FIG. 12, in some aspects, process 1200 may include configuring a medium access control control element (MAC-CE) to indicate beam failure information for one or more serving cells, wherein the beam failure information is associated with at least one of a first transmit-receive point (TRP) or a second TRP of the one or more serving cells (block 1210). For example, the UE (e.g., using MAC signaling component 1408, depicted in FIG. 14) may configure a MAC-CE (e.g., a multi-TRP BFR MAC-CE) to indicate beam failure information for one or more serving cells, wherein the beam failure information is associated with at least one of a first TRP or a second TRP of the one or more serving cells, as described above.

As further shown in FIG. 12, in some aspects, process 1200 may include transmitting the MAC-CE to a base station via at least one serving cell (block 1220). For example, the UE (e.g., using transmission component 1404, depicted in FIG. 14) may transmit the MAC-CE to a base station via at least one serving cell, as described above.

Process 1200 may include additional aspects, such as any single aspect or any combination of aspects described below and/or in connection with one or more other processes described elsewhere herein.

In a first aspect, configuring the MAC-CE further comprises configuring a bitmap in the MAC-CE, wherein a first group of bits of the bitmap indicates whether a beam failure has occurred for the first TRP on an associated serving cell of the one or more serving cells, and wherein a second group of bits of the bitmap indicates whether a beam failure has occurred for the second TRP on an associated serving cell of the one or more serving cells.

In a second aspect, alone or in combination with the first aspect, process 1200 includes configuring, in the MAC-CE, one or more bytes associated with the one or more serving cells, wherein a byte, of the one or more bytes, associated with a TRP, of the first TRP and the second TRP, and a serving cell, of the one or more serving cells, includes a first field indicating whether the byte includes an indication of a new beam for the TRP and the serving cell, and a second field for the indication of the new beam.

In a third aspect, alone or in combination with one or more of the first and second aspects, the byte includes a third field indicating whether both TRPs associated with the serving cell are associated with a same beam status, and wherein the MAC-CE omits another byte associated with another TRP, of the first TRP and the second TRP, other than the TRP associated with the byte, if the third field indicates that both TRPs are associated with the same beam status.

In a fourth aspect, alone or in combination with one or more of the first through third aspects, the one or more bytes are configured so that an indication of a new beam associated with the first TRP is prioritized over an indication of a new beam associated with the second TRP.

In a fifth aspect, alone or in combination with one or more of the first through fourth aspects, the MAC-CE includes a bit indicating whether beam failure has occurred for a special cell of the one or more serving cells.

In a sixth aspect, alone or in combination with one or more of the first through fifth aspects, configuring the MAC-CE further comprises configuring the MAC-CE based at least in part on the beam failure occurring for the special cell, wherein the MAC-CE omits a field indicating whether a byte includes an indication of a new beam for the special cell based at least in part on the beam failure occurring for the special cell.

In a seventh aspect, alone or in combination with one or more of the first through sixth aspects, configuring the MAC-CE further comprises configuring a bitmap in the MAC-CE, wherein a first group of bits of the bitmap indicates whether a beam failure has occurred on an associated serving cell of the one or more serving cells, wherein a second group of bits of the bitmap indicates whether a subsequent set of bytes indicates a single new beam or multiple new beams, and wherein a third group of bits of the bitmap indicates whether the single new beam is associated with the first TRP or the second TRP.

In an eighth aspect, alone or in combination with one or more of the first through seventh aspects, the third group of bits is valid only if the second group of bits indicates that the subsequent set of bytes indicates a single new beam.

In a ninth aspect, alone or in combination with one or more of the first through eighth aspects, process 1200 includes configuring, in the MAC-CE, the subsequent set of bytes associated with the serving cell, wherein a byte, of the subsequent set of bytes, associated with a TRP, of the first TRP and the second TRP, and the serving cell includes a first field indicating whether the byte includes an indication of a new beam for the TRP and the serving cell, and a second field for the indication of the new beam.

In a tenth aspect, alone or in combination with one or more of the first through ninth aspects, configuring the MAC-CE further comprises configuring a byte in the MAC-CE, wherein a first field of the byte indicates whether a subsequent set of bytes indicates a single new beam or multiple new beams for a serving cell of the one or more serving cells, wherein a second field of the byte indicates whether the single new beam is associated with the first TRP or the second TRP of the serving cell, and wherein a third field of the byte indicates a serving cell identifier of the serving cell.

In an eleventh aspect, alone or in combination with one or more of the first through tenth aspects, the second field is valid only if the first field indicates that the subsequent set of bytes indicates a single new beam.

In a twelfth aspect, alone or in combination with one or more of the first through eleventh aspects, process 1200 includes configuring, in the MAC-CE, the subsequent set of bytes associated with the serving cell, wherein a byte, of the subsequent set of bytes, associated with a TRP, of the first TRP and the second TRP, and a serving cell, of the one or more serving cells, includes a first field indicating whether the byte includes an indication of a new beam for the TRP and the serving cell, and a second field for the indication of the new beam.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a base station, in accordance with various aspects of the present disclosure. Example process 1300 is an example where the base station (e.g., base station 110) performs operations associated with beam failure recovery medium access control signaling for a multi transmit-receive point system.

As shown in FIG. 13, in some aspects, process 1300 may include receiving a MAC-CE to indicate beam failure information for one or more serving cells, wherein the beam failure information is associated with at least one of a first TRP or a second TRP of the one or more serving cells (block 1310). For example, the base station (e.g., using reception component 1502, depicted in FIG. 15) may receive a MAC- CE (e.g., a multi-TRP BFR MAC-CE) to indicate beam failure information for one or more serving cells, wherein the beam failure information is associated with at least one of a first TRP or a second TRP of the one or more serving cells, as described above.

As further shown in FIG. 13, in some aspects, process 1300 may include performing a beam failure recovery operation based at least in part on the beam failure information (block 1320). For example, the base station (e.g., using BFR component 1508, depicted in FIG. 15) may perform a beam failure recovery operation based at least in part on the beam failure information, as described above.

Process 1300 may include additional aspects, such as any single aspect or any combination of aspects described below and/or in connection with one or more other processes described elsewhere herein.

In a first aspect, the MAC-CE includes a bitmap, wherein a first group of bits of the bitmap indicates whether a beam failure has occurred for the first TRP on an associated serving cell of the one or more serving cells, and wherein a second group of bits of the bitmap indicates whether a beam failure has occurred for the second TRP on an associated serving cell of the one or more serving cells.

In a second aspect, alone or in combination with the first aspect, the MAC-CE includes one or more bytes associated with the one or more serving cells, wherein a byte, of the one or more bytes, associated with a TRP, of the first TRP and the second TRP, and a serving cell, of the one or more serving cells, includes a first field indicating whether the byte includes an indication of a new beam for the TRP and the serving cell, and a second field for the indication of the new beam.

In a third aspect, alone or in combination with one or more of the first and second aspects, the byte includes a third field indicating whether both TRPs associated with the serving cell are associated with a same beam status, and wherein the MAC-CE omits another byte associated with another TRP, of the first TRP and the second TRP, other than the TRP associated with the byte, if the third field indicates that both TRPs are associated with the same beam status.

In a fourth aspect, alone or in combination with one or more of the first through third aspects, the one or more bytes are configured so that an indication of a new beam associated with the first TRP is prioritized over an indication of a new beam associated with the second TRP.

In a fifth aspect, alone or in combination with one or more of the first through fourth aspects, the MAC-CE includes a bit indicating whether beam failure has occurred for a special cell of the one or more serving cells.

In a sixth aspect, alone or in combination with one or more of the first through fifth aspects, the MAC-CE omits a field indicating whether a byte includes an indication of a new beam for the special cell based at least in part on a beam failure occurring for the special cell.

In a seventh aspect, alone or in combination with one or more of the first through sixth aspects, the MAC-CE includes a bitmap, wherein a first group of bits of the bitmap indicates whether a beam failure has occurred on an associated serving cell of the one or more serving cells, wherein a second group of bits of the bitmap indicates whether a subsequent set of bytes indicates a single new beam or multiple new beams, and wherein a third group of bits of the bitmap indicates whether the single new beam is associated with the first TRP or the second TRP.

In an eighth aspect, alone or in combination with one or more of the first through seventh aspects, the third group of bits is valid only if the second group of bits indicates that the subsequent set of bytes indicates a single new beam.

In a ninth aspect, alone or in combination with one or more of the first through eighth aspects, the MAC-CE includes the subsequent set of bytes associated with the serving cell, wherein a byte, of the subsequent set of bytes, associated with a TRP, of the first TRP and the second TRP, and the serving cell includes a first field indicating whether the byte includes an indication of a new beam for the TRP and the serving cell, and a second field for the indication of the new beam.

In a tenth aspect, alone or in combination with one or more of the first through ninth aspects, the MAC-CE includes a byte, wherein a first field of the byte indicates whether a subsequent set of bytes indicates a single new beam or multiple new beams for a serving cell of the one or more serving cells, wherein a second field of the byte indicates whether the single new beam is associated with the first TRP or the second TRP of the serving cell, and wherein a third field of the byte indicates a serving cell identifier of the serving cell.

In an eleventh aspect, alone or in combination with one or more of the first through tenth aspects, the second field is valid only if the first field indicates that the subsequent set of bytes indicates a single new beam.

In a twelfth aspect, alone or in combination with one or more of the first through eleventh aspects, the MAC-CE includes the subsequent set of bytes associated with the serving cell, wherein a byte, of the subsequent set of bytes, associated with a TRP, of the first TRP and the second TRP, and a serving cell, of the one or more serving cells, includes a first field indicating whether the byte includes an indication of a new beam for the TRP and the serving cell, and a second field for the indication of the new beam.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
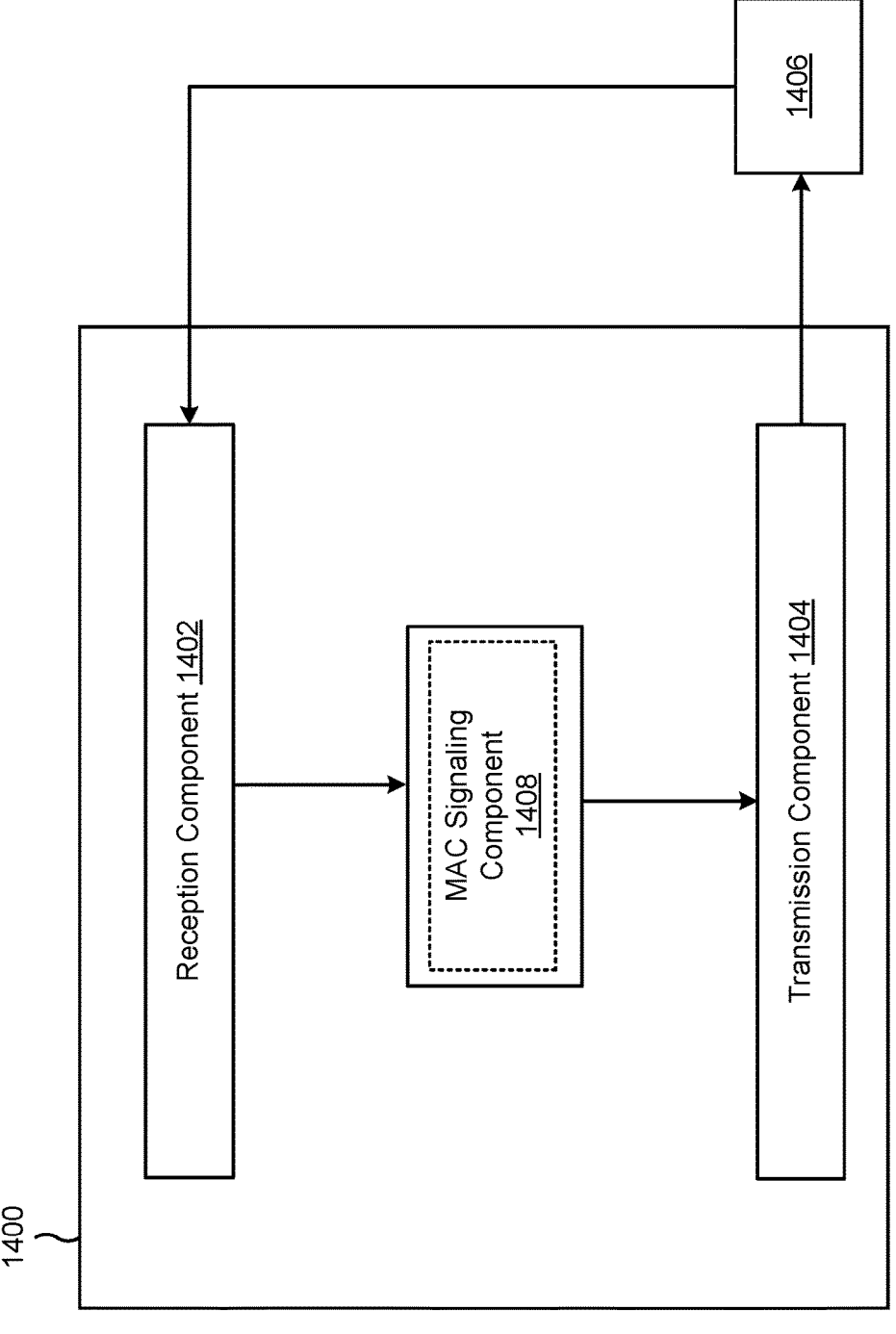
FIGS. 14-15 are block diagrams of example apparatuses for wireless communication, in accordance with various aspects of the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a MAC signaling component 1408, among other examples.

In some aspects, the apparatus 1400 may be configured to perform one or more operations described herein in connection with FIGS. 3-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The MAC signaling component 1408 may configure a MAC-CE to indicate beam failure information for one or more serving cells, wherein the beam failure information is associated with at least one of a first TRP or a second TRP of the one or more serving cells. The MAC signaling component 1408 may include controller/processor 280, transmit processor 264, TX MIMO processor 266, MOD 254, antenna 252, or the like. The transmission component 1404 may transmit the MAC-CE to a base station via at least one serving cell.

The MAC signaling component 1408 may configure, in the MAC-CE, one or more bytes associated with the one or more serving cells wherein a byte, of the one or more bytes, associated with a TRP, of the first TRP and the second TRP, and a serving cell, of the one or more serving cells, includes: a first field indicating whether the byte includes an indication of a new beam for the TRP and the serving cell, and a second field for the indication of the new beam.

The MAC signaling component 1408 may configure, in the MAC-CE, the subsequent set of bytes associated with the serving cell wherein a byte, of the subsequent set of bytes, associated with a TRP, of the first TRP and the second TRP, and the serving cell includes: a first field indicating whether the byte includes an indication of a new beam for the TRP and the serving cell, and a second field for the indication of the new beam.

The MAC signaling component 1408 may configure, in the MAC-CE, the subsequent set of bytes associated with the serving cell wherein a byte, of the subsequent set of bytes, associated with a TRP, of the first TRP and the second TRP, and a serving cell, of the one or more serving cells, includes: a first field indicating whether the byte includes an indication of a new beam for the TRP and the serving cell, and a second field for the indication of the new beam.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
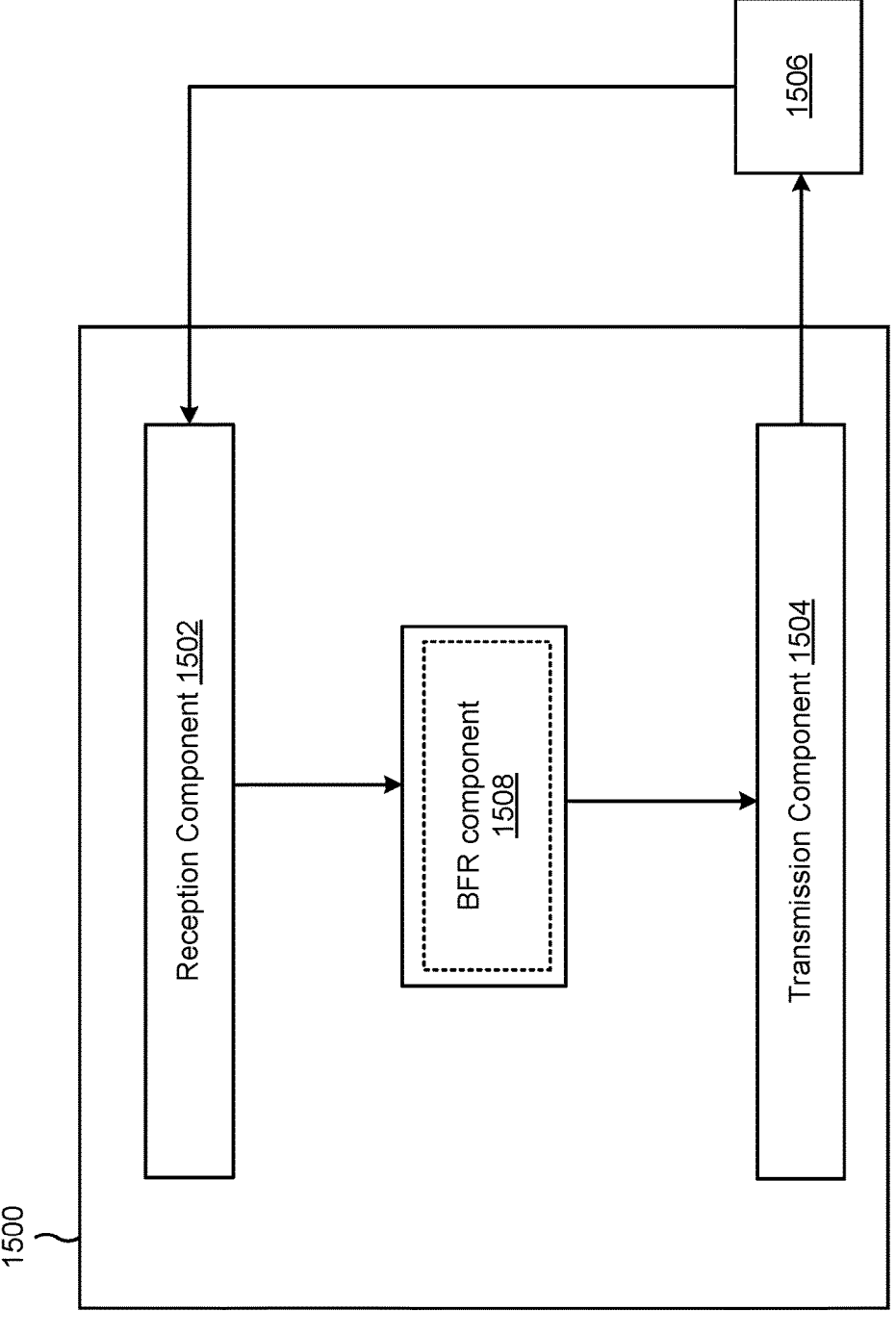

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a BFR component 1508, among other examples.

In some aspects, the apparatus 1500 may be configured to perform one or more operations described herein in connection with FIGS. 3-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The reception component 1502 may receive a MAC-CE to indicate beam failure information for one or more serving cells, wherein the beam failure information is associated with at least one of a first TRP or a second TRP of the one or more serving cells. The BFR component 1508 may perform a beam failure recovery operation based at least in part on the beam failure information.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   configuring a medium access control control element (MAC-CE) to indicate beam failure information for one or more serving cells, the MAC-CE comprising:
   a first set of one or more bits indicating whether a beam failure has occurred on the one or more serving cells;
   a second set of one or more bits indicating whether a subsequent set of bits indicates a single new beam or multiple new beams; and
   a third set of one or more bits indicating whether the single new beam or the multiple new beams is associated with a first transmit-receive point (TRP) or a second TRP; and
   transmitting the MAC-CE to a base station via at least one serving cell.

2. The method of claim 1, wherein the first set of one or more bits comprises a bitmap, wherein a first portion of the bitmap indicates whether a beam failure has occurred for the first TRP, and wherein a second portion of the bitmap indicates whether the beam failure has occurred for the second TRP.

3. A method of wireless communication performed by a base station, comprising:

receiving a medium access control control element (MAC-CE) to indicate beam failure information for one or more serving cells, the MAC-CE comprising:

a first set of one or more bits indicating whether a beam failure has occurred on the one or more serving cells;

a second set of one or more bits indicating whether a subsequent set of bits indicates a single new beam or multiple new beams; and a third set of one or more bits indicating whether the single new beam or the multiple new beams is associated with a first transmit-receive point (TRP) or a second TRP; and performing a beam failure recovery operation based at least in part on the beam failure information.

4. The method of claim 3, wherein the first set of one or more bits comprises a bitmap, wherein a first portion of the bitmap indicates whether a beam failure has occurred for the first TRP, and wherein a second portion of the bitmap indicates whether the beam failure has occurred for the second TRP.

5. A user equipment (UE) for wireless communication, comprising:

one or more memories;

one or more processors coupled to the one or more memories; and instructions stored in the one or more memories and operable, when executed by the one or more processors, to cause the UE to:

configure a medium access control control element (MAC-CE) to indicate beam failure information for one or more serving cells, the MAC-CE comprising:

a first set of one or more bits indicating whether a beam failure has occurred on the one or more serving cells;

a second set of one or more bits indicating whether a subsequent set of bits indicates a single new beam or multiple new beams; and a third set of one or more bits indicating whether the single new beam or the multiple new beams is associated with a first transmit-receive point (TRP) or a second TRP; and transmit the MAC-CE to a base station via at least one serving cell.

6. The UE of claim 5, wherein the first set of one or more bits comprises a bitmap, wherein a first portion of the bitmap indicates whether a beam failure has occurred for the first TRP, and wherein a second portion of the bitmap indicates whether the beam failure has occurred for the second TRP.

7. The UE of claim 6, wherein the one or more processors are further configured to:

configure, in the MAC-CE, one or more bits included in the subsequent set of bits associated with the one or more serving cells, wherein a set of the one or more bits included in the subsequent set of bits and that is associated with a TRP of the first TRP and the second TRP and a serving cell of the at least one serving cell, includes:

a first bit indicating whether the set of the one or more bits included in the subsequent set of bits includes an indication of a new beam for the TRP and the at least one serving cell, and one or more additional bits representing the indication of the new beam.

8. The UE of claim 7, wherein the second set of one or more bits includes a third bit indicating whether both TRPs associated with the at least one serving cell are associated with a same beam status, and wherein the MAC-CE omits another portion of the second set of one or more bits associated with another TRP, of the first TRP and the second TRP, other than the TRP associated with the beam status, when the third bit indicates that both TRPs are associated with the same beam status.

9. The UE of claim 7, wherein the one or more bits included in the subsequent set of bits indicate a new beam associated with the first TRP with priority over a new beam associated with the second TRP.

10. The UE of claim 5, wherein the first set of one or more bits includes a bit indicating whether beam failure has occurred for a special cell of the one or more serving cells.

11. The UE of claim 10, wherein the one or more processors, when configuring the MAC-CE, are configured to:

configure the MAC-CE based at least in part on the beam failure occurring for the special cell, wherein the MAC-CE omits one or more bits indicating whether the subsequent set of bits includes an indication of a new beam for the special cell, based at least in part on the beam failure occurring for the special cell.

12. The UE of claim 5, wherein the third set of one or more bits is valid only when the second set of one or more bits indicates that the subsequent set of bits indicates the single new beam.

13. The UE of claim 5, wherein the one or more processors are further configured to:

configure, in the MAC-CE, the subsequent set of bits associated with the at least one serving cell, wherein the subsequent set of bits, associated with a TRP of the first TRP and the second TRP and the at least one serving cell, includes:

a first bit indicating whether the subsequent set of bits includes an indication of a new beam for the TRP and the at least one serving cell, and one or more additional bits representing the indication of the new beam.

14. The UE of claim 5, wherein the second bit of the third set of one or more bits is valid only when the first bit of the third set of one or more bits indicates that the subsequent set of bits indicates a single new beam.

15. The UE of claim 5, wherein the one or more processors are further configured to:

configure, in the MAC-CE, the subsequent set of bits associated with the at least one serving cell, wherein the subsequent set of bits, associated with a TRP of the first TRP and the second TRP and a serving cell of the at least one serving cell, includes:

a first bit indicating whether the subsequent set of bits includes an indication of a new beam for the TRP and the at least one serving cell, and one or more additional bits representing the indication of the new beam.

16. The UE of claim 5, wherein the first set of one or more bits includes a bit indicating whether beam failure has occurred simultaneously for both the first TRP and the second TRP associated with a serving cell of the one or more serving cells.

17. The UE of claim 5, wherein the MAC-CE further includes a fourth set of one or more bits indicating a priority level for performing beam failure recovery among multiple serving cells.

18. A base station for wireless communication, comprising:

one or more memories;

one or more processors coupled to the one or more memories; and instructions stored in the one or more memories and operable, when executed by the one or more processors, to cause the base station to:

receive a medium access control control element (MAC-CE) to indicate beam failure information for one or more serving cells, the MAC-CE comprising:

a first set of one or more bits indicating whether a beam failure has occurred on the one or more serving cells;

a second set of one or more bits indicating whether a subsequent set of bits indicates a single new beam or multiple new beams; and a third set of one or more bits indicating whether the single new beam or the multiple new beams is associated with a first transmit-receive point (TRP) or a second TRP; and perform a beam failure recovery operation based at least in part on the beam failure information.

19. The base station of claim 18, wherein the first set of one or more bits comprises a bitmap, wherein a first portion of the bitmap indicates whether a beam failure has occurred for the first TRP, and wherein a second portion of the bitmap indicates whether a beam failure has occurred for the second TRP.

20. The base station of claim 19, wherein the MAC-CE includes one or more bits in the second set of one or more bits associated with the one or more serving cells, wherein the second set of one or more bits, associated with a TRP of the first TRP and the second TRP and a serving cell of the one or more serving cells, includes:

a first bit indicating whether the second set of one or more bits includes an indication of a new beam for the TRP and the at least one serving cell, and one or more additional bits representing the indication of the new beam.

21. The base station of claim 20, wherein the second set of one or more bits includes a third bit indicating whether both TRPs associated with the at least one serving cell are associated with a same beam status, and wherein the MAC-CE omits another portion of the second set of one or more bits associated with another TRP, of the first TRP and the second TRP, other than the TRP associated with the beam status, when the third bit indicates that both TRPs are associated with the same beam status.

22. The base station of claim 20, wherein the second set of one or more bits indicate a new beam associated with the first TRP with priority over a new beam associated with the second TRP.

23. The base station of claim 18, wherein the first set of one or more bits includes a bit indicating whether beam failure has occurred for a special cell of the one or more serving cells.

24. The base station of claim 23, wherein the MAC-CE omits one or more bits indicating whether the second set of one or more bits includes an indication of a new beam for the special cell, based at least in part on a beam failure occurring for the special cell.

25. The base station of claim 18, wherein the third set of one or more bits is valid only when the second set of one or more bits indicates that the subsequent set of bits indicates the single new beam.

26. The base station of claim 18, wherein the MAC-CE includes the subsequent set of bits associated with the at least one serving cell, wherein the subsequent set of bits, associated with a TRP of the first TRP and the second TRP and the at least one serving cell, includes:

a first bit indicating whether the subsequent set of bits includes an indication of a new beam for the TRP and the at least one serving cell, and one or more additional bits representing the indication of the new beam.

27. The base station of claim 18, wherein the MAC-CE includes a group of bits, wherein a first bit of the group indicates whether a subsequent set of bits indicates a single new beam or multiple new beams for a serving cell of the one or more serving cells, wherein a second bit of the group indicates whether the single new beam or the multiple new beams is associated with the first TRP or the second TRP of the at least one serving cell, and wherein a third bit of the group indicates a serving cell identifier of the at least one serving cell.

28. The base station of claim 27, wherein the second bit is valid only when the first bit indicates that the subsequent set of bits indicates the single new beam.

29. The base station of claim 27, wherein the MAC-CE includes the subsequent set of bits associated with the at least one serving cell, wherein the subsequent set of bits, associated with a TRP of the first TRP and the second TRP and a serving cell of the one or more serving cells, includes:

a first bit indicating whether the set of the one or more bits included in the subsequent set of bits includes an indication of a new beam for the TRP and the at least one serving cell, and one or more additional bits representing the indication of the new beam.

30. The base station of claim 18, wherein the instructions are further operable to:

transmit an acknowledgment message to a user equipment (UE) based at least in part on the beam failure information indicated in the MAC-CE.

* * * * *